United States Patent
Ouyang et al.

(10) Patent No.: US 10,042,117 B2
(45) Date of Patent: Aug. 7, 2018

(54) PHOTONIC-CRYSTAL ALL-OPTICAL AND-TRANSFORMATION LOGIC GATE

(71) Applicant: Zhengbiao Ouyang, Guangdong (CN)

(72) Inventors: Zhengbiao Ouyang, Guangdong (CN); Quanqiang Yu, Guangdong (CN)

(73) Assignee: Zhengbiao Ouyang, Shenzhen (CN)

( * ) Notice: Subject to any disclaimer, the term of this patent is extended or adjusted under 35 U.S.C. 154(b) by 0 days.

(21) Appl. No.: 15/626,283

(22) Filed: Jun. 19, 2017

(65) Prior Publication Data

US 2017/0293080 A1    Oct. 12, 2017

Related U.S. Application Data

(63) Continuation of application No. PCT/CN2015/097848, filed on Dec. 18, 2015.

(30) Foreign Application Priority Data

Dec. 19, 2014   (CN) .......................... 2014 1 0799714

(51) Int. Cl.
| | |
|---|---|
| *G02F 3/00* | (2006.01) |
| *G02B 6/122* | (2006.01) |
| *G02B 6/125* | (2006.01) |
| *G02F 1/365* | (2006.01) |
| *G02B 6/12* | (2006.01) |
| *B82Y 20/00* | (2011.01) |

(52) U.S. Cl.
CPC ........... *G02B 6/1225* (2013.01); *G02B 6/125* (2013.01); *G02F 1/365* (2013.01); *B82Y 20/00* (2013.01); *G02B 2006/1213* (2013.01); *G02F 3/00* (2013.01)

(58) Field of Classification Search
CPC ................. G02B 6/1225; G02B 6/125; G02B 2006/1213; G02F 1/365; G02F 1/0126; G02F 3/00; G02F 3/02; G02F 2/004; B82Y 20/00
USPC ...... 359/108, 243, 244; 385/17, 31; 398/141
See application file for complete search history.

(56) References Cited

U.S. PATENT DOCUMENTS

| | | | |
|---|---|---|---|
| 7,263,262 B1 * | 8/2007 | Covey ................ | G02B 6/29355 385/122 |
| 2005/0163419 A1 * | 7/2005 | Scherer ................ | G02F 1/0126 385/16 |

* cited by examiner

*Primary Examiner* — Collin X Beatty

(57) ABSTRACT

The present invention discloses a photonic crystal (PhC) all-optical AND-transformation logic gate, which comprises a PhC-structure unit, an optical-switch unit, a wave-absorbing load, a NOT-logic gate and a D-type flip-flop; two intermediate-signal output ports of the optical-switch unit are respectively connected with the intermediate-signal input port and the wave-absorbing load of the PhC-structure unit; a clock-signal CP input port is connected with three-branch waveguide, and three output ports are respectively connected with first clock-signal CP input port of the optical-switch unit, second clock-signal CP input port of the PhC-structure unit and the NOT-logic-gate input port; the NOT-logic-gate output port is connected with third clock-signal CP input port of the D-type flip-flop; the signal-output port of the PhC-structure unit is connected with the D-signal input port of the D-type flip-flop. The structure of the present invention is compact in structure and ease of integration with other optical-logic elements.

8 Claims, 2 Drawing Sheets

| A | B | C | Y |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 0 |
| 1 | 1 | 0 | 1 |
| 1 | 1 | 1 | 1 |

PHOTONIC-CRYSTAL ALL-OPTICAL AND-TRANSFORMATION LOGIC GATE

CROSS-REFERENCE TO RELATED APPLICATION

This application is a continuation application of PCT Application No. PCT/CN2015/097848 filed on Dec. 18, 2015, which claims priority to Chinese Patent Application No. 201410799714.3 filed on Dec. 19, 2014, the entire contents of which are hereby incorporated by reference.

FIELD OF THE INVENTION

The present invention relates generally to two-dimensional (2D) photonic crystal (PhC) optical AND-transformation logic gates.

BACKGROUND OF THE INVENTION

In 1987, the concept of PhC was proposed separately by E. Yablonovitch from United States Bell Labs who discussed how to suppress spontaneous radiation and by S. John from Princeton University who made discussions about photonic localization. The PhC is a material structure in which dielectric materials are arranged periodically in space, and is usually an artificial crystal consisting of two or more materials having different dielectric constants.

With the emergence of and in-depth research on photonic crystal, people can control the motion of photons in a PhC material more flexibly and effectively. In combination with traditional semiconductor processes and integrated circuit technologies, design and manufacture of PhC and devices thereof have continually and rapidly marched towards all-optical processing, and the PhC has become a breakthrough for photonic integration. In December 1999, the PhC was recognized by the American influential magazine *Science* as one of the top-ten scientific advances in 1999, and therefore has become a hot topic in today's scientific research field.

An all-optical logic device mainly includes an optical amplifier-based logic device, a non-linear loop-mirror logic device, a Sagnac-interference-type logic device, a ring-cavity logic device, a multi-mode-interference logic device, an optical waveguide-coupled logic device, a photoisomerized logic device, a polarization-switch optical-logic device, a transmission-grating optical-logic device, etc. These optical-logic devices have the common shortcoming of large size in developing large-scale integrated optical circuits. With the improvement of science and technology in recent years, people have also done research and developed quantum optical-logic devices, nanomaterial optical-logic devices and PhC optical-logic devices, which all conform to the dimensional requirement of large-scale photonic integrated optical circuits. For modern manufacturing processes, however, the quantum optical-logic devices and the nanomaterial optical-logic devices are very difficult to be manufactured, whereas the PhC optical-logic devices have competitive advantages in terms of manufacturing process.

In recent years, PhC logic devices have become a hot area of research drawing widespread attentions, and it is highly likely for them to replace the current widely-applied electronic logic devices in the near future. The PhC logic device can directly realize all-optical logical functions, such as "AND", "OR", "NOT" and the like, and is a core device for realizing all-optical computing. In the process of realizing all-optical computing, PhC logical function devices based on "AND", "OR", "NOT", "XOR" and the like have been successfully designed and studied, and various complex logic components are still needed for achieving the goal of all-optical computing.

SUMMARY OF THE INVENTION

The present invention is aimed at overcoming the defects of the prior art and providing an all-optical AND-transformation logic gate which is compact in structure, strong in anti-interference capability and easy to integrate with other optical-logic elements.

The aim of the present invention is fulfilled through the following technical solution.

A PhC-structure unit, an optical-switch unit, a wave absorbing load, a NOT-logic gate and a D-type flip-flop; two system signal-input ports of the optical-switch unit are respectively connected with a first logic-signal $X_1$ and a second logic-signal $X_2$, two intermediate-signal output ports of the optical-switch unit are respectively connected with an intermediate-signal input port and the wave-absorbing load of the PhC-structure unit; a clock-signal CP input port is connected with a three-branch waveguide, and three output port are respectively connected with the first clock-signal CP input port of the optical-switch unit, a second clock-signal CP input port of the PhC-structure unit and the NOT-logic-gate input port; the NOT-logic-gate output port is connected with a third clock-signal CP input port of the D-type flip-flop; the signal-output port of the PhC-structure unit is connected with the D-signal input port of the D-type flip-flop.

The PhC-structure unit is a 2D-PhC cross-waveguide nonlinear cavity and is a 2D-PhC cross-waveguide four-port network formed by high-refractive-index pillars, the four-port network has a four-port PhC structure, a left port is the first intermediate-signal input port, a lower port is the second intermediate-signal input port, an upper port is a signal-output port, and a right port is an idle port; two mutually-orthogonal quasi-1D PhC structures are placed in two waveguide directions crossed at a center of the cross waveguide, a dielectric pillar is arranged in a middle of the cross waveguide, the dielectric pillar is made of a nonlinear material, and a cross section of the dielectric pillar is square, polygonal, circular or oval; and the dielectric constant of a rectangular linear pillar clinging to the central nonlinear pillar and close to the signal-output port is equal to that of the central nonlinear pillar under low-light-power conditions; and the quasi-1D PhC structures and the dielectric pillar constitute a waveguide defect cavity.

The optical-switch unit is a 2×2 optical-selector switch, and includes a clock-signal CP input port, two system signal-input ports and two intermediate-signal output ports; and the two signal-input ports are respectively first logic-signal input port and second logic-signal input port, and the two intermediate-signal output ports are respectively the first intermediate-signal output port and the second intermediate-signal output port.

The D-type flip-flop unit includes a clock-signal input port, a D-signal input port and a system signal output port; an input signal at the D-signal input port in the D-type flip-flop unit is equal to the output signal at the output port in the PhC-structure unit.

The 2D PhC is of a (2k+1)×(2k+1) structure, where k is an integer more than or equal to 3.

The cross section of the high-refractive-index dielectric pillar of the 2D PhC is circular, oval, triangular or polygonal.

A background filling material for the 2D PhC is air or a different low-refractive-index medium with a refractive index less than 1.4.

The refractive index of the dielectric pillar in the quasi-1D PhC of the cross-waveguide is 3.4 or a different value more than 2, and the cross section of the dielectric pillar in the quasi-1D PhC is rectangular, oval, triangular or polygonal.

Compared with the prior art, the present invention has the following advantages:

1. Compact in structure, and ease of manufacture;
2. Strong anti-interference capability, and ease of integration with other optical-logic elements; and
3. High contrast of high and low logic outputs, and fast operation.

These and other objects and advantages of the present invention will become readily apparent to those skilled in the art upon reading the following detailed description and claims and by referring to the accompanying drawings.

BRIEF DESCRIPTION OF THE DRAWINGS

In FIG. 1, the indications are: PhC-structure unit 01, second clock-signal input port 11, intermediate-signal input port 12, idle port 13, signal-output port 14, circular high-refractive-index linear-dielectric pillar 15, first rectangular high-refractive-index linear-dielectric pillar 16, second rectangular high-refractive-index linear-dielectric pillar 17, nonlinear-dielectric pillar 18, first logic-signal $X_1$, second logic-signal $X_2$, optical-switch unit 02, first logic-signal input port 21, second signal-input port 22, first intermediate-signal output port 23, second intermediate-signal output port 24, wave-absorbing load 03, first clock-signal CP input port, NOT logic 04, D-type flip-flop 05, third clock-signal input port 51, D signal-input port 52, system-output port 53.

The present invention is more specifically described in the following paragraphs by reference to the drawings attached only by way of example.

DETAILED DESCRIPTION OF THE EMBODIMENTS

The terms a or an, as used herein, are defined as one or more than one, the term plurality, as used herein, is defined as two or more than two, and the term another, as used herein, is defined as at least a second or more.

Figure 1:
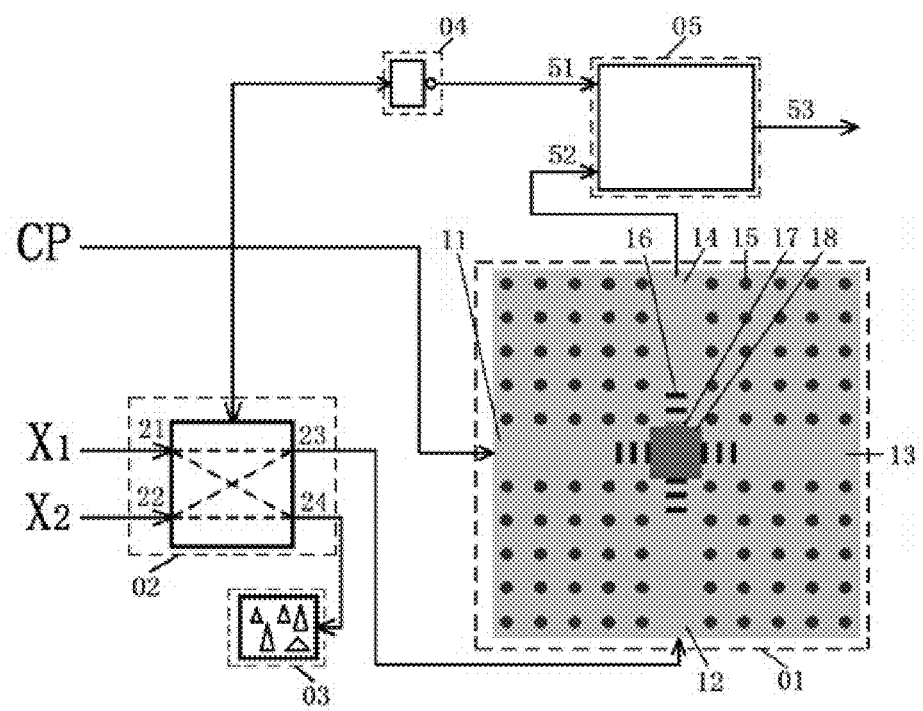
FIG. 1 is a structural schematic diagram of a PhC all-optical AND-transformation logic gate of the present invention.

As shown in FIG. 1, the PhC all-optical AND-transformation logic gate of the present invention includes a PhC-structure unit 01, an optical-switch unit 02, a wave-absorbing load 03, a NOT-logic gate 04 and a D-type flip-flop 05; the PhC-structure unit 01 is a 2D-PhC cross-waveguide nonlinear cavity and is arranged behind the optical-switch unit, the background filling material for the 2D PhC is air or a different low-refractive-index medium with a refractive index less than 1.4, the cross section of the high-refractive-index dielectric pillar of the 2D PhC is circular, oval, triangular or polygonal, the 2D-PhC cross-waveguide nonlinear cavity is a 2D-PhC cross-waveguide four-port network formed by high-refractive-index dielectric pillars, the four-port network has a four-port PhC structure, the left port is a clock-signal input port 51, the lower port is an intermediate-signal input port, the upper port is a signal-output port, and the right port is an idle port; two mutually-orthogonal quasi-1D PhC-structure s are placed in two waveguide directions crossed at the center of a cross-waveguide, the cross section of the dielectric pillar in the quasi-1D PhC is rectangular, polygonal, circular or oval, the refractive index of the dielectric pillar is 3.4 or a different value more than 2, an dielectric pillar is arranged in the middle of the cross waveguide, the dielectric pillar is made of a nonlinear material, the cross section of the dielectric pillar is square, polygonal, circular or oval, and the quasi-1D PhC structure and the dielectric pillar constitute a waveguide defect cavity. The lattice constant of the 2D-PhC array is d, and the array number is 11×11; the circular high-refractive-index linear-dielectric pillar 15 is made of a silicon (Si) material, and has a refractive index of 3.4 and a radius of 0.18d; the first rectangular high-refractive-index linear-dielectric pillar 16 has a refractive index of 3.4, long sides of 0.613d and short sides of 0.162d; the second rectangular high-refractive-index linear-dielectric pillar 17 has a dielectric constant being the same as that of a nonlinear-dielectric pillar under low-light-power conditions, and has a dimension equal to that of the first rectangular high-refractive-index linear-dielectric pillar 16; and the central square nonlinear-dielectric pillar 18 is made of a Kerr type nonlinear material, and has a side length of 1.5d, a dielectric constant of 7.9 under low-light-power and a third-order nonlinear coefficient of $1.33 \times 10^{-2}$ μm$^2$/V$^2$. Twelve rectangular high linear-dielectric pillars and one square nonlinear-dielectric pillar are arranged in the center of the 2D-PhC cross-waveguide nonlinear cavity in the form of a quasi-1D PhC along longitudinal and transverse waveguide directions, the central nonlinear-dielectric pillar clings to the four adjacent rectangular linear-dielectric pillars and the distance there between is 0, every two adjacent rectangular linear-dielectric pillars are spaced 0.2668d from each other, and the dielectric constant of a rectangular linear pillar clinging to the central nonlinear pillar and close to the signal-output port is equal to that of the central nonlinear-pillar under low-light-power conditions; the optical-switch unit 01 is a 3×3 optical-selector switch controlled by a clock-signal CP, is used for controlling and selecting a logic signal for outputting, and the unit 01 includes a clock-signal CP input port, two system signal-input ports, and two intermediate-signal output ports; and two system signal-input ports are respectively a first signal-output port and a second signal-output port; and two intermediate-signal output ports are respectively a first intermediate-signal output port and a second intermediate-signal output port, first logic-signal $X_1$ and second logic-signal $X_2$ are respectively connected with the first logic-signal-input port 21 and the second logic-signal-input port 22 of the optical-switch unit 02; the first intermediate-signal output port 23 of the optical-switch unit 02 is connected with the intermediate-signal input port 12 of the PhC-structure unit 01, the two intermediate-signal output ports of the optical-switch unit 02 is connected with the wave-absorbing load 03, the wave-absorbing load is used for absorbing light wave entering it; the D-type flip-flop 05 includes a clock-signal-input port, a D signal-input port and a system-output port; the input signal of the D signal-input port 52 of the D-type flip-flop 05 is equal to the output signal of the output port of the PhC-structure unit 01; a clock control-signal CP is input through the input port of a three-branch waveguide, the first output port of the three-branch waveguide is connected with the first clock-signal CP input port of the optical-switch unit 01, the second output port of the three-branch waveguide is connected with the second clock-signal-input port 11 of the PhC-structure unit 01 and the third output port of the three-branch waveguide is connected with the NOT-logic-gate input port 04; the NOT-logic-gate output port 04 is connected with the third clock-signal CP input port 51 of the D-type flip-flop 05, the NOT-logic gate is arranged between the clock-signal CP input port and D-type flip-flop 05, and is used for performing NOT logic operation on the clock-signal CP and further projecting the clock-signal CP to the clock-signal-input port 51 of the D-type flip-flop 05; the signal-output port 14 of the PhC-structure unit 01 is connected with the D signal-input port 52 of the D-type flip-flop 05, i.e., the D signal-input port of the D-type flip-flop is equal to the output signal of the output port of the PhC-structure unit 01; the system signal-output port 53 of the D-type flip-flop 05 is the system-output port of the PhC all-optical AND-transformation logic gate of the present invention.

The present invention can realize an AND-transformation logic gate function of all-optical logic signals under the cooperation of unit devices such as the optical-switch, based on the photonic bandgap (PBG) characteristic, quasi-1D PhC defect state, tunneling effect and optical Kerr nonlinear effect of the 2D-PhC cross-waveguide nonlinear cavity shown by 01 in FIG. 1. Introduced first is the basic principle of the PhC nonlinear cavity in the present invention: a 2D PhC provides a PBG with a certain bandwidth, a light wave with its wavelength falling into this bandgap can be propagated in an optical path designed inside the PhC, and the operating wavelength of the device is thus set to a certain wavelength in the PBG; the quasi-1D PhC structure arranged in the center of the cross-waveguide and the nonlinear effect of the central nonlinear-dielectric pillar together provide a defect state mode, which, for the input light wave reaches a certain light intensity, shifts to the operating frequency of the system, so that the structure produces the tunneling effect and signals are output from the output port 14.

Figure 2:
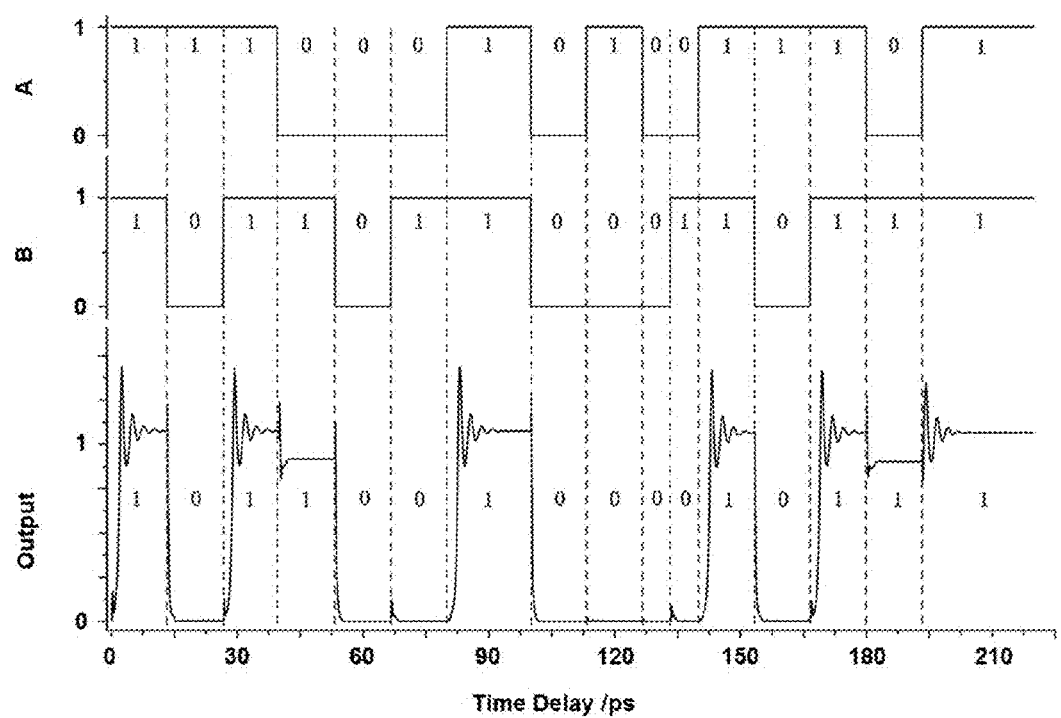
FIG. 2 is a waveform diagram of the basic logic functions of a PhC-structure unit shown in FIG. 1 for the lattice constant d of 1 μm and the operating wavelength of 2.976 μm.
Figures 3, 4:
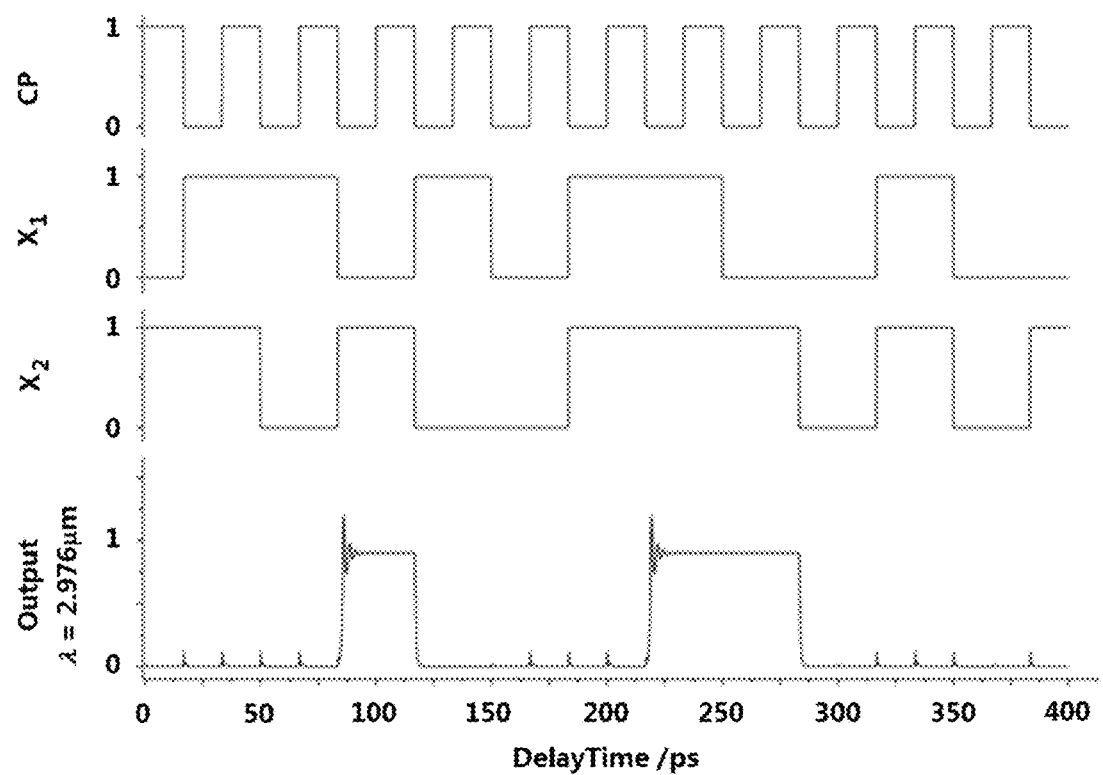
FIG. 3 is a waveform diagram of two-logic-signal AND-transformation logic function of the present invention for the lattice constant d of 1 μm and the operating wavelength of 2.976 μm.
FIG. 4 is a truth table of the logic functions of a 2D-PhC cross-waveguide nonlinear cavity shown in FIG. 1.

For the lattice constant d of 1 μm and the operating wavelength of 2.976 μm, referring to the 2D-PhC cross-waveguide nonlinear cavity shown by 01 in FIG. 1, and for a signal A input from the clock-signal-input port 11 and a signal B input from the intermediate-signal-input port 12, as indicated by the upper two diagrams in FIG. 2, a logic output waveform diagram of the 2D-PhC cross-waveguide nonlinear cavity of the present invention can be obtained, as indicated by the lower part diagram in FIG. 2. A logic operation truth table shown in FIG. 4 can be obtained according to the logic operation characteristic shown in FIG. 2. In FIG. 4, C is a current state $Q^n$, and Y is signal-output at the output port 14 of the PhC-structure unit 01—the next state $Q^{n+1}$. A logic expression of the nonlinear-cavity structure can be obtained according to the truth table:

$$Y=AB+BC \quad (1)$$

That is $$Q^{n+1}=AB+BQ^n \quad (2)$$

According to the basic logic operation characteristic of the above 2D-PhC cross-waveguide nonlinear cavity, the logic output of the previous step serves as a logic input to the nonlinear cavity itself to realize logic functions.

As shown in FIG. 1, for CP=1, the optical-selector switch turns the logic $X_1(n)$ at the logic-signal $X_1$ input port 21 to the first intermediate-signal-output port 23 of the optical-selector switch, and the input signal $X_1(n)$ is further projected to the intermediate-signal-input port 12 of the PhC structure unit 01, i.e., the input signal of the intermediate-signal-input port of the PhC structure unit is equal to the first logic-signal $X_1(n)$; and simultaneously, the optical-selector switch turns the second logic-signal $X_2(n)$ at the logic-signal-input port 22 to the second intermediate-signal-output port 24 of the optical-selector switch, and the logic-signal $X_2(n)$ is further projected to the wave-absorbing load 03.

For CP=0, the optical-selector switch turns the second logic-signal $X_2(n+1)$ at the second logic-signal $X_2$ input port 22 to the first intermediate-signal-output port 23 of the optical-selector switch, and the input signal $X_2(n+1)$ is further projected to the intermediate-signal-input port 12 of the PhC-structure unit 01, i.e., the input signal of the intermediate-signal input port of the PhC-structure unit is equal to the logic-signal $X_2(n+1)$; and simultaneously, the optical-selector switch turns the logic-signal $X_1(n+1)$ at the logic-signal-input port 21 to the second intermediate-signal output port 24 of the optical-selector switch, and the logic-signal $X_1(n+1)$ is further projected to the wave-absorbing load 03.

With the cooperation described above, the AND-transformation logic function of all-optical logic signals can be realized.

The PhC structure of the device in the present invention can be of a $(2k+1)\times(2k+1)$ array structure, where k is an integer more than or equal to 3. Design and simulation results will be provided below in an embodiment given in combination with the accompanying drawings, wherein the embodiment is exemplified by an $11\times11$ array structure and a lattice constant d of 1 μm.

In formula (2), suppose A=1, leading to $$Q^{n+1}=B \quad (3)$$

In formula (2), suppose A=0, leading to $$Q^{n+1}=BQ^n \quad (4)$$

Thus, the signal $X_1$ is input to the intermediate-signal input port 12 of a PhC-structure unit 01 at the moment $t_n$, i.e., B=$X_1$; simultaneously, supposing that the input signal A of the port 11 is equal to 1, the logic input-signal $X_1(t_n)$ at the moment $t_n$ is stored in an optical circuit; then, at the moment $t_{n+1}$, supposing that the logic input signal A of the port 11 is equal to 0, the logic input signal of the intermediate-signal-input port 12 is $X_2(t_{n+1})$, the output signal of the PhC-structure unit 01 is:

$$Q^{n+1}=X_2(t_{n+1})X_1(t_n) \quad (5)$$

Thus, a clock control-signal CP needs to be introduced into the system; as CP=1, the system stores the logic input signal $X_1(t_n)$ at the current moment; and for CP=0, the system carries out AND operation on the logic input signal $X_2(t_{n+1})$ at the current moment and the signal $X_1(t_n)$ stored by the system at the last moment.

The optical-selector switch operates as follows under the control of a clock-signal CP:

At a moment $t_n$, CP is made equal to 1, the optical-selector switch turns the signal $X_1(t_n)$ at the first logic-signal $X_1$ input port 21 to the first intermediate-signal-output port, and the signal $X_1(t_n)$ is further projected to the intermediate-signal-input port 12 of the PhC-structure unit 01; and simultaneously, the optical-selector switch turns the signal $X_2(t_n)$ at the second logic-signal $X_2$ input port 22 to the second intermediate-signal output port 24, and the signal $X_2(t_n)$ is further projected to the wave-absorbing load 03; The input-signal of the clock-signal-input port 11 of the PhC-structure unit 01 is synchronous with the clock-signal CP, i.e. A=CP=1, and the output of the port 14 at this moment can be obtained from the expression (2):

$$Q^{n+1} = X_1(t_n) \quad (6)$$

At a moment $t_{n+1}$, CP is made equal to 0, the optical-selector switch gates the signal $X_1(t_{n+1})$ at the logic-signal $X_1$ input port 21 to the second intermediate-signal output port 24, and the signal $X_1(t_{n+1})$ is further projected to the wave-absorbing load 03; and simultaneously, the optical-switch unit 02 turns the signal $X_2(t_{n+1})$ at the second logic-signal $X_2$ input port 22 to the first intermediate-signal output port 23, and the signal $X_2(t_{n+1})$ is further projected to the intermediate-signal input port 12 of the PhC-structure unit 01; The input signal of the clock-signal input port 11 of the PhC-structure unit 01 is synchronous with the clock-signal CP, i.e. A=CP=0; the output of the port 14 at this moment can be obtained from the expression (2):

$$Q^{n+1} = X_2(t_{n+1}) X_1(t_n) \quad (7)$$

The output of the output port 14 of the PhC-structure unit 01 is equal to the input of the D signal-input port 52 of the D-type flip-flop 05, and it can be obtained from the expressions (6) and (7) that the input signal D of the D signal-input port 52 is $X_1(t_n)$ for CP=1 and is $X_2(t_{n+1})X_1(t_n)$ for CP=0. Because the clock-signal-input port 51 of the D-type flip-flop 05 is connected with the output port of the NOT-logic gate 04, for CP=0, the system output of the D-type flip-flop 05 follows the input signal D; and for CP=1, the system output keeps the input signal D of the previous moment. Thus, it can be known that the output $Q^{n+1}$ of the system-output port 53 of the device in the present invention is $Q^{n+1} = X_2(t_{n+1})X_1(t_n)$ when CP=0; and at a next moment when CP=1, the system output keeps the output of the previous moment, i.e., the system output in a clock cycle is:

$$Q^{n+1} = X_2(t_{n+1}) X_1(t_n) \quad (8)$$

Hence, the device in the present invention can realize the AND-transformation logic function of two logic signals.

For the operating wavelength of the device being 2.976 μm, the lattice constant d is 1 μm for the PhC-structure unit 01; the radius of the circular high-refractive-index linear-dielectric pillar 15 is 0.18 μm; the long sides of the first rectangular high-refractive-index linear-dielectric pillar 16 are 0.613 μm, and the short sides are 0.162 μm; the size of the second rectangular high-refractive-index linear-dielectric pillar 17 is the same as that of the first rectangular high-refractive-index linear-dielectric pillar 16; the side length of the central square nonlinear-dielectric pillar 18 is 1.5 μm, and the third-order nonlinear coefficient is 1.33×$10^{-2}$ μm²/V²; and the distance between every two adjacent rectangular linear-dielectric pillars is 0.2668 μm. Based on the above dimensional parameters, as the signal $X_1$ and $X_2$ are input according to the waveforms shown in FIG. 3, a system-output waveform diagram as indicated at the lower part in FIG. 3 can be obtained under the control of the clock-signal CP. Hence, the system carries out AND-logic operation on the logic input quantity $X_2(t_{n+1})$ and the logic input quantity $X_1(t_n)$ at the previous moment. That is, the AND-transformation logic function of two logic signals is realized.

With reference to FIG. 3, the device in the present invention can realize the same logic function under different lattice constants and corresponding operating wavelengths by scaling.

In conclusion, a AND-transformation logic function of all-optical logic signals in the present invention can be realized by the control of the clock-signal CP of the clock-signal-input port under the coordination of relevant unit devices, such as the optical-switch and wave-absorbing load.

In the logic-signal processing in an integrated optical circuit, self-convolution operation of a different single logic signal can be defined, and the above-mentioned AND logic operation of logic signals is a basic operation of the self-convolution operation of logic signals. The AND-transformation logic function of logic signals realized in the present invention plays an important role in realizing self-correlation transformation or self-convolution operation of logic variables.

While the invention has been described in terms of various specific embodiments, those skilled in the art will recognize that the invention can be practiced with modification within the spirit and scope of the claims.

What is claimed is:

1. A PhC all-optical AND-transformation logic gate, wherein said PhC all-optical AND-transformation logic gate comprises:

a PhC-structure unit, an optical-switch unit, a wave-absorbing load, a NOT-logic gate and a D-type flip-flop; two system-signal input ports of the optical-switch unit are respectively connected with a first logic-signal $X_1$ and the second logic-signal $X_2$, two intermediate-signal output ports of the optical-switch unit are respectively connected with an intermediate-signal input port and said wave-absorbing load of said PhC-structure unit; a clock-signal CP input port is connected with a three-branch waveguide, and three output port are respectively connected with the first clock-signal CP input port of said optical-switch unit, a second clock-signal CP input port of the PhC-structure unit and said NOT-logic-gate input port; said NOT-logic-gate output port is connected with a third clock-signal CP input port of said D-type flip-flop; the signal-output port of said PhC-structure unit is connected with the D-signal input port of said D-type flip-flop.

2. The PhC all-optical AND-transformation logic gate of claim 1, wherein said PhC-structure unit is a 2D-PhC cross-waveguide nonlinear cavity and is a 2D-PhC cross-waveguide four-port network formed by high-refractive-index pillars, the four-port network has a four-port PhC structure, a left port is said first intermediate-signal input port, a lower port is said second intermediate-signal input port, an upper port is a signal-output port, and a right port is an idle port; two mutually-orthogonal quasi-1D PhC structures are placed in two waveguide directions crossed at a center of said cross waveguide, a dielectric pillar is arranged in a middle of said cross waveguide, said dielectric pillar is made of a nonlinear material, and a cross section of said dielectric pillar is square, polygonal, circular or oval; and the dielectric constant of a rectangular linear pillar clinging to the central nonlinear pillar and close to the signal-output port is equal to that of said central nonlinear pillar under low-light-power conditions; and said quasi-1D PhC structures and said dielectric pillar constitute a waveguide defect cavity.

3. The PhC all-optical AND-transformation logic gate of claim 1, wherein said optical-switch unit is a 2×2 optical selector switch, and includes a clock-signal CP input port, two system signal-input ports and two intermediate-signal output ports; and said two signal-input ports are respectively first logic signal input port and second logic signal logic-signal input port, and said two intermediate-signal output ports are respectively the first intermediate-signal output port and the second intermediate-signal output port.

4. The PhC all-optical AND-transformation logic gate of claim 1, wherein said D-type flip-flop unit includes a clock-signal input port, a D-signal input port and a system-signal output port; an input signal at said D-signal input port in said D-type flip-flop unit is equal to the output signal at said output port in said PhC structure unit.

5. The PhC all-optical AND-transformation logic gate of claim 2, wherein said 2D PhC is of a (2k+1)×(2k+1) structure, where k is an integer more than or equal to 3.

6. The PhC all-optical AND-transformation logic gate of claim 2, wherein said cross section of the high-refractive-index dielectric pillar of said 2D PhC is circular, oval, triangular or polygonal.

7. The PhC all-optical AND-transformation logic gate of claim 2, wherein a background filling material for the 2D PhC is air or a different low-refractive-index medium with a refractive index less than 1.4.

8. The PhC all-optical AND-transformation logic gate of claim 2, wherein said refractive index of said dielectric pillar in the quasi-1D PhC of said cross-waveguide is 3.4 or a different value more than 2, and the cross section of said dielectric pillar in said quasi-1D PhC is rectangular, oval, triangular or polygonal.

* * * * *